United States Patent
Pani et al.

(10) Patent No.: US 9,357,466 B2
(45) Date of Patent: *May 31, 2016

(54) METHOD AND APPARATUS FOR PERFORMING A SERVING CELL CHANGE

(71) Applicant: InterDigital Patent Holdings, Inc., Wilmington, DE (US)

(72) Inventors: Diana Pani, Montreal (CA); Christopher R. Cave, Dollard-des-Ormeaux (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,113

(22) Filed: Oct. 15, 2013

(65) Prior Publication Data

US 2014/0044102 A1 Feb. 13, 2014

Related U.S. Application Data

(63) Continuation of application No. 13/401,579, filed on Feb. 21, 2012, now Pat. No. 8,570,980, which is a continuation of application No. 12/408,138, filed on Mar. 20, 2009, now Pat. No. 8,144,664.

(60) Provisional application No. 61/038,581, filed on Mar. 21, 2008.

(51) Int. Cl.
*H04W 4/00* (2009.01)
*H04W 36/30* (2009.01)
(Continued)

(52) U.S. Cl.
CPC ............. *H04W 36/30* (2013.01); *H04L 1/0026* (2013.01); *H04L 1/1671* (2013.01); *H04L 1/1829* (2013.01); *H04L 1/0003* (2013.01); *H04L 1/009* (2013.01); *H04L 1/0038* (2013.01)

(58) Field of Classification Search
None
See application file for complete search history.

(56) References Cited

U.S. PATENT DOCUMENTS

| 6,424,833 | B1 | 7/2002 | Iizuka et al. |
| 7,680,082 | B2 | 3/2010 | Lindoff |

(Continued)

FOREIGN PATENT DOCUMENTS

| EP | 1 198 149 | 4/2002 |
| EP | 1 773 009 | 4/2007 |

(Continued)

OTHER PUBLICATIONS

Ericsson, "HS-PDSCH Serving Cell Change Enhancements", 3GPP TSG-RAN WG2#61, R2-080785, (Sorrento, Italy, Feb. 11-15, 2008).

(Continued)

*Primary Examiner* — Chi H Pham
*Assistant Examiner* — Soon-Dong D Hyun
(74) *Attorney, Agent, or Firm* — Condo Roccia Koptiw LLP

(57) ABSTRACT

A method and apparatus for performing a serving high speed downlink shared channel (HS-DSCH) cell change from a source cell to a target cell are disclosed. A wireless transmit/receive unit (WTRU) may be pre-configured with HS-DSCH configuration for the target cell. The WTRU may start monitoring a high speed shared control channel (HS-SCCH) on the target cell using the pre-loaded HS-DSCH configuration for the target cell on a condition that a measurement report is triggered by the event 1D. The WTRU may initiate a timer when the WTRU starts monitoring the HS-SCCH on the target cell.

24 Claims, 2 Drawing Sheets

(51) Int. Cl.
  *H04L 1/16* (2006.01)
  *H04L 1/18* (2006.01)
  *H04L 1/00* (2006.01)

(56) References Cited

U.S. PATENT DOCUMENTS

| | | | |
|---|---|---|---|
| 7,821,996 B2 | 10/2010 | Cai et al. | |
| 8,259,674 B2* | 9/2012 | Shimobayashi | 370/331 |
| 2004/0085926 A1 | 5/2004 | Hwang et al. | |
| 2006/0128312 A1 | 6/2006 | Declerck et al. | |
| 2006/0239229 A1 | 10/2006 | Marinescu et al. | |
| 2006/0240831 A1 | 10/2006 | Toskala et al. | |
| 2007/0049311 A1* | 3/2007 | Lindoff et al. | 455/515 |
| 2007/0109986 A1 | 5/2007 | Kwak et al. | |
| 2007/0121552 A1 | 5/2007 | Lindoff | |
| 2007/0184838 A1 | 8/2007 | Van Der Velde et al. | |
| 2008/0130584 A1 | 6/2008 | Pani et al. | |
| 2008/0159218 A1 | 7/2008 | Dwarakanath | |
| 2008/0261599 A1 | 10/2008 | Mohanty et al. | |
| 2008/0311910 A1 | 12/2008 | Ishii et al. | |
| 2009/0034473 A1* | 2/2009 | Shimobayashi | 370/331 |
| 2009/0181677 A1 | 7/2009 | Tanigawa et al. | |
| 2010/0041427 A1 | 2/2010 | Hannu et al. | |
| 2010/0172319 A1* | 7/2010 | Shimobayashi | 370/331 |

FOREIGN PATENT DOCUMENTS

| | | |
|---|---|---|
| JP | 2004-363950 | 12/2004 |
| WO | WO 2007-040331 | 4/2007 |

OTHER PUBLICATIONS

Lucent Technologies, "Proposal for supporting Real Time services over HSDPA," 3GPP TSG-RAN1 Meeting #40bis, R1-050324 (Apr. 4-8, 2005).
Nokia, "New CPC test case: Active set update in soft handover: Radio Link addition and serving HS-DSCH / E-DCH cell change, with discontinuous uplink transmission," 3GPP TSG RAN WG R5 Meeting #38, R5-080304 (Jan. 28-Feb. 1, 2008).
Qualcomm Europe, "Enhanced HSDPA Re-pointing Scheme", 3GPP TSG-RAN WG2#48-bis, R2-052568, (Cannes, France, Oct. 10-14, 2005).
Qualcomm Europe, "HS-DSCH Serving Cell Change Performance In Urban Canyon Environments", 3GPP TSG-RAN WG2#60-bis, R2-080371, (Seville, Spain, Jan. 15-19, 2008).
Qualcomm Europe, "Improving Reliability of HS-PDSCH Serving Cell Change Procedure", 3GPP TSG-RAN WG2#61, R2-081015, (Sorrento, Italy, Feb. 11-15, 2008).
Qualcomm, "Enhanced HSDPA Re-pointing Scheme," 3GPP TSG-RAN WG2 meeting #48, R2-051969 (Aug. 29-Sep. 2, 2005).
Samsung, "HSDPA re-pointing", 3GPP TSG-RAN WG2#48-bis, R2-052528, (Cannes, France, Aug. 10-14, 2005).
Third Generation Partnership Project, "Technical Specification Group Radio Access Network; High Speed Downlink Packet Access (HSDPA); Overall Description; Stage 2 (Release 5)", 3GPP TS 25.308 V5.7.0 (Dec. 2004).
Third Generation Partnership Project, "Technical Specification Group Radio Access Network; High Speed Downlink Packet Access (HSDPA); Overall Description; Stage 2 (Release 6)", 3GPP TS 25.308 V6.4.0 (Mar. 2007).
Third Generation Partnership Project, "Technical Specification Group Radio Access Network; High Speed Downlink Packet Access (HSDPA); Overall Description; Stage 2 (Release 7)", 3GPP TS 25.308 V7.6.0 (Mar. 2008).
Third Generation Partnership Project, "Technical Specification Group Radio Access Network; High Speed Downlink Packet Access (HSDPA); Overall Description; Stage 2 (Release 7)", 3GPP TS 25.308 V7.9.0 (Dec. 2004).
Third Generation Partnership Project, "Technical Specification Group Radio Access Network; High Speed Downlink Packet Access (HSDPA); Overall Description; Stage 2 (Release 8)", 3GPP TS 25.308 V8.1.0 (Mar. 2008).
Third Generation Partnership Project, "Technical Specification Group Radio Access Network; High Speed Downlink Packet Access (HSDPA); Overall Description; Stage 2 (Release 8)", 3GPP TS 25.308 V8.5.0 (Mar. 2009).
Third Generation Partnership Project, "Technical Specification Group Radio Access Network; Physical Layer Procedures (FDD); (Release 1999)", 3GPP TS 25.214 V3.12.0 (Mar. 2003).
Third Generation Partnership Project, "Technical Specification Group Radio Access Network; Physical Layer Procedures (FDD); (Release 1999)", 3GPP TS 25.214 V4.6.0 (Mar. 2003).
Third Generation Partnership Project, "Technical Specification Group Radio Access Network; Physical Layer Procedures (FDD); (Release 5)", 3GPP TS 25.214 V5.11.0 (Jun. 2005).
Third Generation Partnership Project, "Technical Specification Group Radio Access Network; Physical Layer Procedures (FDD); (Release 6)", 3GPP TS 25.214 V6.11.0 (Dec. 2006).
Third Generation Partnership Project, "Technical Specification Group Radio Access Network; Physical Layer Procedures (FDD); (Release 7)", 3GPP TS 25.214 V7.8.0 (Mar. 2008).
Third Generation Partnership Project, "Technical Specification Group Radio Access Network; Physical Layer Procedures (FDD); (Release 7)", 3GPP TS 25.214 V7.11.0 (Mar. 2009).
Third Generation Partnership Project, "Technical Specification Group Radio Access Network; Physical Layer Procedures (FDD); (Release 8)", 3GPP TS 25.214 V8.1.0 (Mar. 2008).
Third Generation Partnership Project, "Technical Specification Group Radio Access Network; Physical Layer Procedures (FDD); (Release 8)", 3GPP TS 25.214 V8.5.0 (Mar. 2009).
Third Generation Partnership Project, "Technical Specification Group Radio Access Network; User Equipment (UE) procedures in idle mode and procedures for cell reselection in connected mode; (Release 8)", 3GPP TS 25.304 V8.1.0 (Mar. 2008).
Third Generation Partnership Project, "Technical Specification Group Radio Access Network; User Equipment (UE) procedures in idle mode and procedures for cell reselection in connected mode; (Release 8)", 3GPP TS 25.304 V8.3.0 (Sep. 2008).
Third Generation Partnership Project, "Technical Specification Group Radio Access Network; User Equipment (UE) procedures in idle mode and procedures for cell reselection in connected mode; (Release 8)", 3GPP TS 25.304 V8.5.0 (Mar. 2009).
Third Generation Partnership Project, "Technical Specification Group Radio Access Network; Radio Resource Control (RRC); Protocol Specification (Release 4)," 3GPP TS 25.311 V4.18.0 (Dec. 2007).
Third Generation Partnership Project, "Technical Specification Group Radio Access Network; Radio Resource Control (RRC); Protocol Specification (Release 4)," 3GPP TS 25.311 V4.20.0 (Dec. 2008).
Third Generation Partnership Project, "Technical Specification Group Radio Access Network; Radio Resource Control (RRC); Protocol Specification (Release 5)," 3GPP TS 25.311 V5.21.0 (Dec. 2007).
Third Generation Partnership Project, "Technical Specification Group Radio Access Network; Radio Resource Control (RRC); Protocol Specification (Release 5)," 3GPP TS 25.311 V5.23.0 (Dec. 2008).
Third Generation Partnership Project, "Technical Specification Group Radio Access Network; Radio Resource Control (RRC); Protocol Specification (Release 6)," 3GPP TS 25.311 V6.16.0 (Dec. 2007).
Third Generation Partnership Project, "Technical Specification Group Radio Access Network; Radio Resource Control (RRC); Protocol Specification (Release 6)," 3GPP TS 25.311 V6.21.0 (Mar. 2009).
Third Generation Partnership Project, "Technical Specification Group Radio Access Network; Radio Resource Control (RRC); Protocol Specification (Release 7)," 3GPP TS 25.311 V7.7.0 (Dec. 2007).
Third Generation Partnership Project, "Technical Specification Group Radio Access Network; Radio Resource Control (RRC); Protocol Specification (Release 7)," 3GPP TS 25.331 V7.11.0 (Dec. 2008).

(56) References Cited

OTHER PUBLICATIONS

Third Generation Partnership Project, "Technical Specification Group Radio Access Network; Radio Resource Control (RRC); Protocol Specification (Release 8)," 3GPP TS 25.331 V8.1.0 (Dec. 2008).

Third Generation Partnership Project, "Technical Specification Group Radio Access Network; Radio Resource Control (RRC); Protocol Specification (Release 8)," 3GPP TS 25.331 V8.6.0 (Mar. 2009).

European Telecommunications Standards Institute (ETSI), TS 125 331, V5.21.0, "Universal Mobile Telecommunication System (UMTS); Radio Resource Control (RRC); Protocol specification (3GPP TS 25.331 version 5.21.0 Release 5)", Jan. 2008, 1047 pages.

* cited by examiner

METHOD AND APPARATUS FOR PERFORMING A SERVING CELL CHANGE

CROSS REFERENCE TO RELATED APPLICATION

This application is a continuation of U.S. patent application Ser. No. 13/401,579 filed Feb. 21, 2012, which is a continuation of U.S. patent application Ser. No. 12/408,138 filed Mar. 20, 2009, which issued as U.S. Pat. No. 8,144,664 on Mar. 27, 2012, which claims the benefit of U.S. Provisional Application No. 61/038,581 filed Mar. 21, 2008, the contents of which are hereby incorporated by reference herein.

FIELD OF INVENTION

This application is related to wireless communications.

BACKGROUND

High speed downlink packet access (HSDPA) is a feature that was introduced in Release 5 of the third generation partnership project (3GPP) specification. HSDPA achieves maximum spectral efficiency using three key concepts: adaptive modulation and coding (AMC), fast physical layer retransmissions, (i.e., hybrid automatic repeat request (HARQ)), and fast Node B scheduling.

A handover is a process in which a wireless transmit/receive unit (WTRU) switches from one cell to another without service interruption. FIG. 1 shows a conventional handover from one cell to another. In HSDPA, a WTRU 102 monitors a channel in a single cell, which is called a "serving high speed downlink shared channel (HS-DSCH) cell." When a handover occurs, the WTRU 102 needs to switch to a new serving HS-DSCH cell (target cell 106) and stop communication with an old serving HS-DSCH cell (source cell 104). This procedure is also called serving HS-DSCH cell change.

A WTRU continuously measures the signal strength of neighboring cells. Once the signal strength measured on the monitored common pilot channel (CPICH) of the neighboring cell exceeds that of the serving cell, (i.e., event 1D), the WTRU indicates a radio network controller (RNC) of the change of best cell. The change of best cell is reported from the WTRU to the RNC via a radio resource control (RRC) measurement report. The measurement report contains a measured value and a cell identity (ID). The RNC then makes a decision whether a serving HS-DSCH cell change should take place.

In order to initiate the serving HS-DSCH cell change, a serving radio network controller (SRNC) requests a controlling radio network controller (CRNC) to allocate HS-DSCH resources, (such as HS-DSCH radio network temporary identity (H-RNTI), high speed shared control channel (HS-SCCH) codes, HARQ resources, etc.), for the WTRU in the target cell via radio network subsystem application part (RN-SAP) and Node B application part (NBAP) messages. Once the HS-DSCH resources are reserved, the CRNC provides all the information to the SRNC which in turn sends an RRC handover message to the WTRU. The RRC message that may be used to indicate a serving HS-DSCH cell change to the WTRU includes, but is not limited to, a physical channel reconfiguration message, a transport channel reconfiguration message, a radio bearer reconfiguration message, and an active set update message.

The RRC handover message provides the WTRU with radio access parameters required for the WTRU to start monitoring the target cell. In addition, the RRC message may provide an activation time at which the handover should take place.

Two types of handovers exist: synchronized and unsynchronized handovers. In an unsynchronized handover, the network and the WTRU do not activate and switch the resources at the same time. The activation time for the WTRU given in the handover command is set to "now." This reduces the delays associated with the handover procedure. However, it increases the probability of data loss.

In a synchronized handover, the network and the WTRU activate and switch the resources simultaneously. The network has to set the activation time to a conservative value to account for any kind of delays such as scheduling delay, retransmissions, configuration time etc. Even though the synchronized handover minimizes data losses it may result in a longer delay.

Conventionally, the RRC handover message is sent to the WTRU via the source Node B. The delay associated with the serving HS-DSCH cell change procedure may cause the handover message to fail, resulting in an unacceptable rate of dropped calls. Several proposals have been introduced to optimize the serving HS-DSCH cell change procedure.

In accordance with the proposals, a WTRU and a Node B may be pre-loaded (pre-configured) with HS-DSCH related configuration. When a cell is added to an active set and if the RNC decides the cell can be added to the "HSDPA active set," a WTRU and a Node B are pre-configured with the radio link reconfiguration prepare/ready phase. When a change in best cell occurs the target Node B may be commanded to start scheduling the WTRU with the radio link reconfiguration commit/start phase. This enables the WTRU and the Node B to start communicating faster.

A WTRU may monitor source and target cell HS-SCCHs in parallel. Upon change of best cell, the WTRU sends a measurement report 1D message. After waiting for a configurable amount of time the WTRU starts monitoring the pre-loaded target cell HS-SCCH in addition to the HS-SCCH of the source cell. With this scheme, service discontinuity may be reduced.

A target Node B may be implicitly re-pointed at first scheduling occurrence. When an RNC authorizes the handover and the target Node B is configured and ready, the target Node B may schedule the WTRU on one of HS-SCCHs which are monitored by the WTRU. The first scheduling occurrence from the target Node B implicitly confirms the successful handover. To avoid packet loss the source Node B may provide the RNC a status of how much data still needs to be transmitted.

The handover (or re-pointing) indication may be sent over the target Node B via an HS-SCCH order, via a new physical layer channel, or via a serving cell change channel (SCCCH) that uses the same channelization code as an enhanced dedicated channel (E-DCH) relative grant channel (E-RGCH) and an E-DCH HARQ indicator channel (E-HICH) but with a different signature sequence. The WTRU acknowledges the handover indication by changing the uplink scrambling code or by using a special value of a channel quality indicator (CQI), (e.g., 31).

In accordance with another proposal, following the above proposals, a WTRU requirement may be limited to monitor only one HS-SCCH of the pre-allocated/non serving cell that triggered event 1D. Event 1A and 1B may be reused with different parameter values to create an "HS-DSCH serving candidate set", which is a subset of cells that are almost as good as the best cell. If a cell within an active set becomes almost as good as the active set, event 1A* is triggered. The target Node B configurations are pre-configured and the HS-SCCH codes are allocated. The first HS-SCCH code in the list is called a primary HS-SCCH code. The pre-configuration is sent to a WTRU. When an event 1D occurs, the WTRU only starts monitoring the primary HS-SCCH of the target Node B in addition to the source Node B's HS-SCCH. Upon reception of first scheduling of the target Node B, the WTRU stops receiving HS-DSCH from the source cell. The target Node B considers the reception of a positive acknowledgement (ACK) from the WTRU as an indication of successful handover.

In accordance with yet another proposal, a handover command, (i.e., the handover message), may be sent over the target cell using a common channel with known configuration. WTRUs may use a common HS-DSCH radio network temporary identity (H-RNTI) to monitor HS-SCCH on the target cell. The common information can be broadcasted over system information blocks (SIBs) or configured via dedicated RRC messages. To increase the reliability of the handover message, the network may send the message over both source and target cells.

In order to allow a WTRU in a CELL_DCH state to receive a serving HS-DSCH cell change message over the target cell using common resources, the WTRU has to be able to read the SIB to acquire the HS-DSCH system information. In accordance with the conventional 3GPP specification, WTRUs are not allowed to read the required SIBs while in CELL_DCH. In addition, since the broadcasted message over the SIBs is only repeated according to a repetition factor, a WTRU may not be given enough time to acquire the information. This may result in a failure to receive the handover command. In addition, when dedicated pre-loaded resources are used to enhance the serving HS-DSCH cell change, the change of the best cell outside of the active set may not be performed using such enhancements.

SUMMARY

A method and apparatus for performing a serving HS-DSCH cell change from a source cell to a target cell are disclosed. An RNC may pre-load a WTRU with HS-DSCH configuration for the target cell. The WTRU receives and stores the pre-loaded HS-DSCH configuration. The WTRU may start monitoring an HS-SCCH on the target cell using the pre-loaded HS-DSCH configuration for the target cell on a condition that a measurement report is triggered by the event 1D. The WTRU may initiate a timer when the WTRU starts monitoring the HS-SCCH on the target cell and stop monitoring the HS-SCCH on the target cell upon expiry of the timer.

BRIEF DESCRIPTION OF THE DRAWINGS

A more detailed understanding may be had from the following description, given by way of example in conjunction with the accompanying drawings wherein.

DETAILED DESCRIPTION

Figure 1:
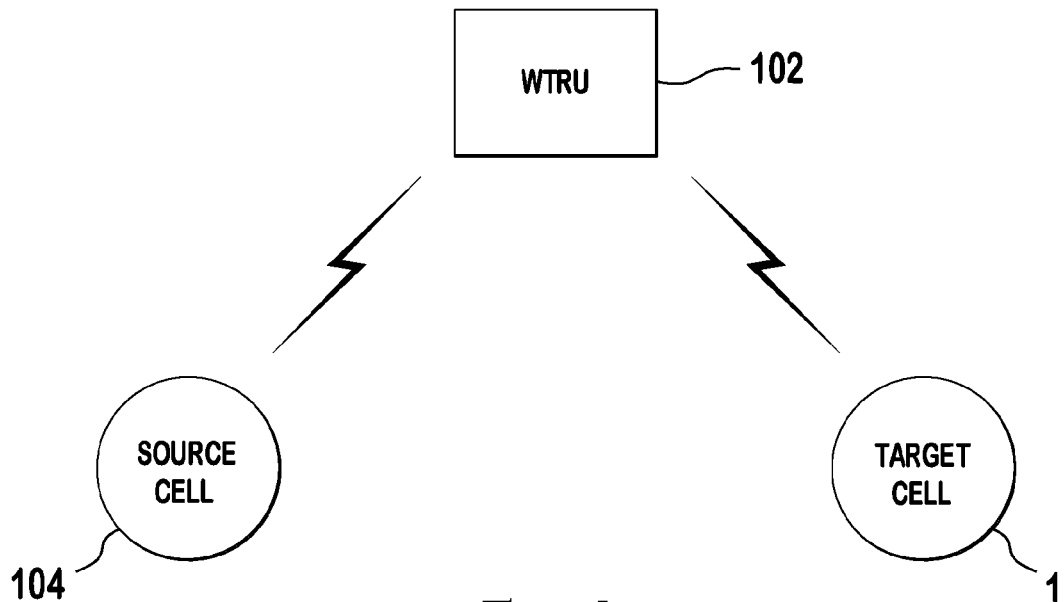
FIG. 1 shows a conventional handover from one cell to another.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

When referred to hereafter "serving HS-DSCH cell change message" may include, but is not limited to, RRC reconfiguration messages or an active set update message that may reconfigure the WTRU to change the serving HS-DSCH cell or a target HS-SCCH order. When referred to hereafter "HS-DSCH common resources" refer to a set of HS-DSCH resources, (i.e., H-RNTI, HS-SCCH codes, HARQ memory allocation, etc), that may be used by one or a group of WTRUs to receive a downlink message. The HS-DSCH common resource may be broadcasted or provided via a dedicated RRC message. Where referred to hereafter "HS-DSCH dedicated resources" or "dedicated resources" refer to a set of pre-loaded target cell information provided to the WTRU as part of the active set update procedure.

Embodiments for acquiring the HS-DSCH common resource are described hereafter.

In accordance with one embodiment, a WTRU acquires HS-DSCH common resources over SIBs or via RRC signaling from a network in Cell_DCH. Conventionally, a WTRU is not allowed or configured to read SIBs sent over a broadcast control channel (BCCH) while in CELL_DCH. HS-DSCH common resources used for enhanced CELL_FACH are broadcasted over SIB5/5bis, and only WTRUs in idle mode, CELL_FACH, CELL_PCH, and URA_PCH may read the SIB5/5bis. In accordance with this embodiment, a WTRU is allowed to read SIB5/5bis (or any other SIB where the HS-DSCH common resources information is provided) while in CELL_DCH.

The HS-DSCH common resources that may be used to receive the serving HS-DSCH cell change message may be the same as the one used for enhanced CELL_FACH in SIB5/5bis or may be a new set of information reserved for the serving HS-DSCH cell change. Alternatively, just HS-SCCH codes and HARQ memory allocation may be the same as for the enhanced CELL_FACH, but a pool of common H-RNTIs may be reserved only for serving HS-DSCH cell change messages. Signaling radio bearer (SRB) mapping info of the SRB used to send the serving HS_DSCH cell change, (i.e., logical channel ID and/or queue ID to map it on), may be broadcast or the WTRU may use the SRB mapping info retrieved while being in the source cell.

The repetition of the system information broadcast in the SIBs may vary from every 4 frames to every 4,096 frames. This parameter is configured and provided in the master information block, and depending on the repetition factor this may cause delays in SIB acquisition time. The WTRU may not need to read the HS-DSCH common resources information on the SIB all the time. The WTRU may be configured to read the HS-DSCH common resources information such that the WTRU is ready to start receiving downlink traffic before or at the time the network sends a message over the target cell. Therefore, the WTRU may account for the repetition factor, the time it takes to read it, the time it takes to configure the resources, and the like.

A WTRU may read the system information block to acquire the HS-DSCH common resources at one or a combination of the following triggers:

(1) A WTRU may read the SIB of the neighboring cell that triggered event 1D, (i.e., the best cell in the monitored set), and store the HS-DSCH common resources information as soon as event 1D is triggered;

(2) A WTRU may read and store the HS-DSCH common resources information as soon as the quality of a neighbor cell becomes better than the serving cell, (i.e., prior to initiating time to trigger ($T_{trigger}$));

(3) A WTRU may read and store the HS-DSCH common resources information as soon as the quality of a neighbor cell becomes better than the serving cell by a pre-configured hysteresis value;

(4) A WTRU may read and store the HS-DSCH common resources information of every cell that is added to the active set as soon as the cell is added to the active set via ACTIVE SET UPDATE procedure, or as soon as event 1A is triggered by the WTRU. The WTRU may have to store the cell ID and the HS information associated to each of the cells. When a change of best cell occurs the WTRU may then extract the HS-DSCH common resources information corresponding to that cell and configure the HS-DSCH resources accordingly;

(5) A WTRU may read and store the HS-DSCH common resources information of the best cell in the monitored set after a time interval Tn since the change of best cell while the condition persists;

(6) A WTRU may read and store the HS-DSCH common resources information of a new cell added to the active set upon triggering of event 1A;

(7) A WTRU may read and store the HS-DSCH common resources information of a new cell added to the active set if event 1A is triggered and the new cell has become the best cell in the active set;

(8) A WTRU may read and store the HS-DSCH common resources information of any new cell for which the measured quality, (e.g., received power on any downlink reference channel such as common pilot channel (CPICH)) exceeds a pre-configured threshold; or (9) A WTRU may read and store the HS-DSCH common resources information of any new cell for which the measured quality, (e.g., received power on any downlink reference channel such as CPICH), approaches the quality of the serving cell by a pre-configured threshold.

Alternatively, the HS-DSCH common resources information may be sent to the WTRU through dedicated RRC signaling. For example, the HS-DSCH common resources information may be included in the ACTIVE SET UPDATE message that is sent to the WTRU when a new cell is added to the active set.

In order to limit the amount of memory required to store the HS-DSCH common resources information from multiple cells, the WTRU may be configured to only store the HS-DSCH common resources information for the N strongest cells or the M last cells to have caused any of the triggering criteria described above. The WTRU may be configured to periodically delete HS-DSCH common resources information stored in memory, delete the HS-DSCH common resources information from memory for any cell for which monitored quality falls below a certain threshold, or delete the HS-DSCH common resources information for any cell that is removed from the WTRU active set.

Embodiments for monitoring the target cell are disclosed hereafter.

A WTRU may start monitoring the target cell using a common resource or a dedicated resource when one or a combination of the following criteria is met:

(1) As soon as a measurement report is sent to the network indicating event 1D;

(2) As soon as a measurement report is sent to the network indicating event 1A and a change of best cell is detected;

(3) As soon as event 1A or 1D is triggered, (i.e., prior to sending a measurement report);

(4) After a time interval (Tm) since a measurement report indicating event 1D, or event 1A with a change of best cell is sent to the network;

(5) After a time interval (Tn) since an RLC layer acknowledgment has been received at the WTRU indicating that the measurement report has been successfully received by the network;

(6) Upon explicit signaling from the source Node B. The explicit signaling may be an HS-SCCH order over the source cell to indicate to the WTRU to start monitoring the target cell. Alternatively, the explicit signaling may be a reserved value in the E-DCH absolute grant channel (E-AGCH) signaled to the WTRU, (e.g., grant=0, deactivation of all HARQ processes, or a reserved value used only for this purpose);

(7) As soon as the channel quality of the source Node B falls below a system configured threshold; or (8) As soon as a radio link failure is detected in the source Node B.

The WTRU may stop monitoring the target cell in one or a combination of the following criteria:

(1) After a predetermined time interval (Tp) has elapsed from the time the WTRU started monitoring the target cell and no handover message has been received. If a handover message is received, (i.e. RRC message or HS-SCCH), the WTRU may stop monitoring the target cell HS-SCCH for an order;

(2) After a periodic timer for resending a measurement report has expired, and/or the WTRU sends another measurement report to the network. The WTRU may start monitoring again the same target cell if the target cell remains the best cell and if the criterion to start monitoring the target cell has been met. If the best cell in the monitored set has changed the WTRU has to stop monitoring the current cell and start monitoring the new cell according to one of the criteria disclosed above;

(3) As soon as a radio link failure is detected in the source cell and there has been no handover message or indication from the target cell for a configured amount of time;

(4) As soon as the received handover message results in an invalid configuration and a handover failure occurs; or (5) Upon receipt of an RLC layer status report at the WTRU indicating that the RRC measurement report was not successfully received by the network.

If a radio link failure occurs while the WTRU is expecting a handover message, the WTRU may report the measurements taken on neighboring cells prior to the radio link failure optionally along with the most recent measurements taken. This information may be sent in the cell update message or sent as a measurement report message after the cell update is sent. This may allow the network to move the WTRU to CELL_DCH in soft handover without any additional delays.

Figure 2:
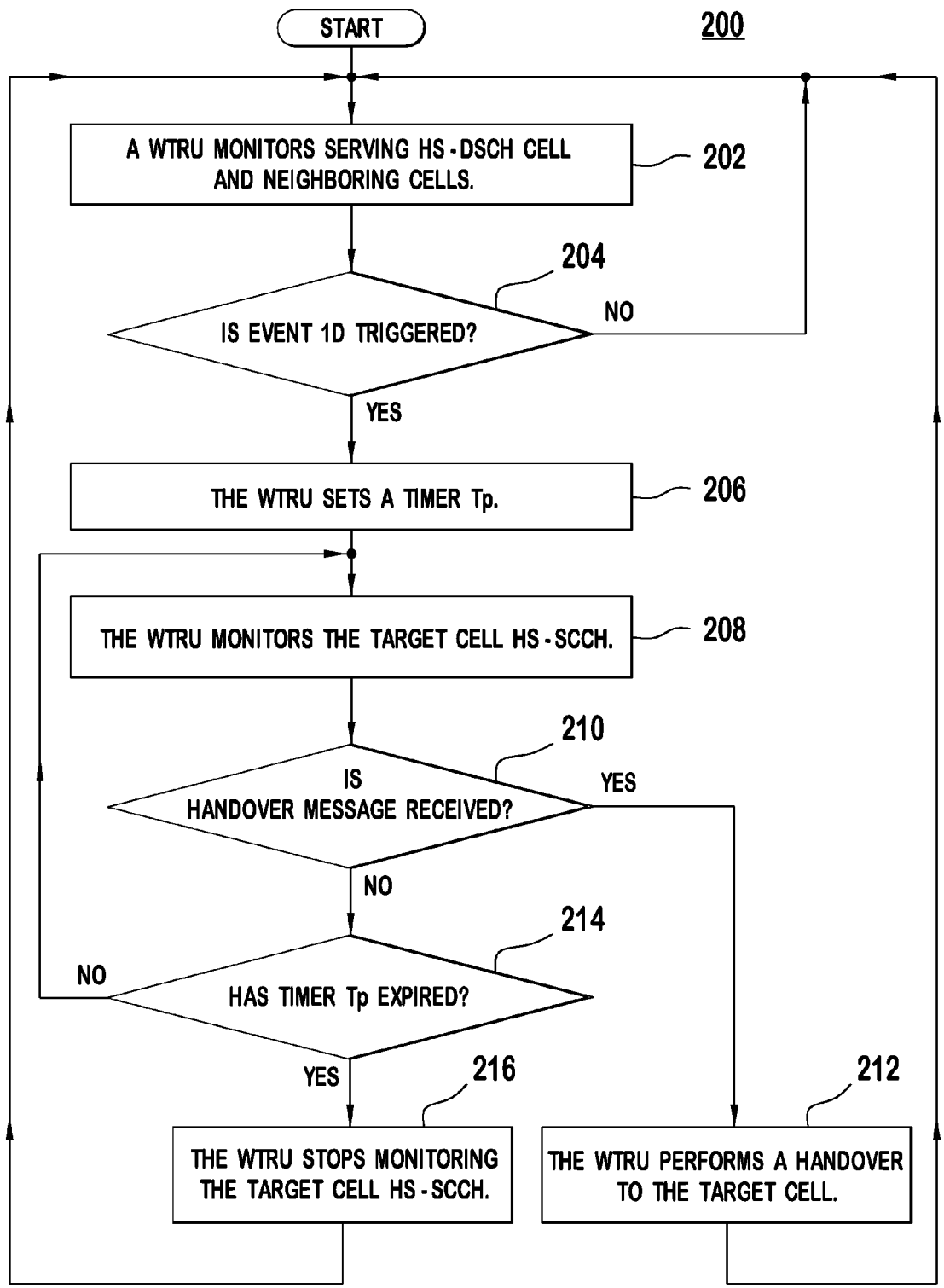
FIG. 2 is a flow diagram of a process of target cell monitoring in accordance with one embodiment.

FIG. 2 is a flow diagram of a process 200 of target cell monitoring in accordance with one embodiment. A WTRU monitors serving HS-DSCH cell and neighboring cell(s) (step 202). The WTRU checks whether event 1D is triggered (step 204). If event 1D is not triggered, the WTRU keeps monitoring the serving HS-DSCH cell. If event 1D is triggered, the WTRU sets a timer Tp (step 206), and starts monitoring the target cell HS-SCCH (if pre-configured) (step 208). The WTRU checks whether a handover message, (i.e., RRC message or HS-SCCH order), is received (step 210). If a handover message is received for the target cell, the WTRU performs serving HS-DSCH cell change (step 212). If a handover message is not received, the WTRU checks whether the timer Tp has expired (step 214). If the timer Tp has expired, the WTRU stops monitoring the target cell HS-SCCH (step 216). If the timer Tp has not expired, the WTRU keeps monitoring the target cell HS-SCCH.

Embodiments for HARQ process sharing when receiving from source and target cells are disclosed hereafter.

When a WTRU is required to start monitoring the target cell using common or dedicated HS-DSCH resources, special care must be taken with the way the HARQ processes are handled. Since the WTRU may still be receiving data in the downlink over the source cell, the WTRU may not be able to flush the HARQ processes used from the source cell. However, at least one HARQ process is required to be able to receive data from the target cell in case of common HS-DSCH reception or in case a dedicated message is received over the target cell.

In accordance with one embodiment, an additional HARQ process may be reserved to receive the handover message over the target cell. The target Node B is aware that the WTRU is only using one HARQ process.

Alternatively, the WTRU may have two sets of HARQ processes, one set of HARQ processes used to receive over the source cell and another set of HARQ processes configured to receive over the target cell. The HARQ system info for the additional set of HARQ resources may be provided as part of the HS-DSCH common system information. This would require the WTRU to set up a set of new HARQ processes every time a handover message is expected over the target cell.

Alternatively, the WTRU may use the same HARQ processes as the source cell when the WTRU decodes its H-RNTI (either common, specific to serving cell, or dedicate) on the HS-SCCH. In this case, the WTRU may have to flush the HARQ buffers prior to receiving the data over the target's HS-PDSCH. The WTRU has to ensure that no data from the source cell is received while data is being received from the target cell. The network may ensure that data is not transmitted over the source cell while the target cell is sending the handover command. This may be done via an Iub indication from the RNC to the source Node B. Optionally, the WTRU may use the fact that data is still being transmitted over the source cell as an indication that the data being received over the target cell is not dedicated to the WTRU. Alternatively, the source cell may keep transmitting data, but the WTRU may not listen to the HS-SCCH of the source cell while receiving a message over the target cell.

Alternatively, the HARQ processes may be split between the source cell and the target cell. For example, a half of the HARQ processes are dedicated for the source cell and the other half for the target cell for the time the WTRU is expecting a message over the target cell, (i.e., monitoring the target cell). The ratio of the HARQ processes used for the source and target cells may be a predefined value, a system configured value provided as part of the HS-DSCH common system information. The network may send an indication to the source cell using Iub signaling to configure the source cell to start using only a portion of the HARQ processes available.

Alternatively, the WTRU may establish a new secondary MAC-ehs or MAC-hs sub-entity for the target cell that the WTRU is monitoring.

The WTRU may flush the soft buffers of the HARQ processes which are configured to be used for the target cell. The flushing may take place at the time the WTRU starts monitoring the target cell or when the expected RNTI is decoded in HS-SCCH of the target cell.

The WTRU may monitor both source and target cells and if the HARQ processes indicated in the HS-SCCH of the source cell interfere with the one being used by the target cell, the WTRU may use this as an indication the message is not for that WTRU. This case is valid when the HARQ processes are shared between the source and target cells and the network should not allow the source cell to transmit on the same HARQ processes as the target cell.

The WTRU must ensure that at least the queue in which the SRB, (i.e., the RRC handover message), is being received is reset. The WTRU may just reset the reordering variables to their initial values and if applicable may discard any remaining segment from the reassembly entity. Alternatively, the WTRU may flush the HARQ processes associated with the target cell or all previous HARQ processes used in the source cell.

Embodiments for completion of the HS-DSCH serving cell change procedure are disclosed hereafter.

Once a WTRU considers the handover successful, the WTRU releases the resources that the WTRU has been assigned from the source cell. The WTRU may release the resources in the source cell in one or a combination of the following cases:

(1) If the handover message is received and the validation of the configuration of the message has been successfully completed in the RRC;

(2) If the handover message is received and an activation time different than now is specified, (the resources are released at the given activation time);

(3) As soon as the WTRU is aware that a message received over the target cell is dedicated to that WTRU;

(4) Upon decoding an HS-SCCH on the target cell with an expected H-RNTI; or (5) Upon explicit signaling from the source Node B. The signaling may be provided via an HS-SCCH order in the source cell to indicate to the WTRU to start decoding the target Node B and release the resources to the source Node B. Alternatively, the signaling may be provided using a reserved value in the E-AGCH, (e.g., grant=0 or deactivate all HARQ processes).

Upon completion of the HS-DSCH serving cell change procedure, the WTRU may be required to only reset HARQ processes and HARQ memory related to HARQ processes that were used in the source cell.

Embodiments for serving cell change to a cell that is not in the active set are disclosed hereafter.

In accordance with one embodiment, if the change of best cell corresponds to a cell that is already included in the active set and HS-DSCH configuration has already been provided to a WTRU, (i.e., pre-loaded), the WTRU may use the pre-loaded HS-DSCH configuration on the target cell, and if a new best cell is not included in the active set, or a change of best cell within an active set is detected but no pre-loaded HS-DSCH configuration is available, the WTRU may use the HS-DSCH common resources to receive the handover command over the target cell. The WTRU triggers a measurement report and starts monitoring the target cell according to one of the embodiments disclosed above using either the dedicated resources or the common resources. Depending on whether the WTRU is using common or dedicated resources, the WTRU may receive an RRC reconfiguration message or an active set update message over the target cell (in case of using common resource), or just a handover indication from the target cell (in case of using dedicated resource).

In accordance with another embodiment, the WTRU may assume that the H-RNTI and one or more HS-SCCH codes used in the source cell will also be available in the target cell. The WTRU monitors the target cell with the same H-RNTI and one or more HS-SCCH codes that the WTRU is using for the source cell. When the network configures the WTRU, the network checks if the same H-RNTI and/or HS-SCCH code(s) is/are available in the target cell. If so, the network may send a handover message to the WTRU over the target cell using the same H-RNTI and/or HS-SCCH code(s).

Alternatively, HS-SCCH codes may be provided over the SIBs or preconfigured for all WTRUs. If they are available in the target cell, the handover message may be sent over the target cell using the same dedicated H-RNTI used in the source cell. Otherwise, the handover message is sent over the source cell. The network may use an HS-SCCH order in the target cell with the same H-RNTI used in the source cell to confirm that the same H-RNTI has been configured for the target cell. The WTRU then monitors the target cell with the same H-RNTI to receive the handover message. Optionally, if the HS-SCCH order has not been received the WTRU may then start monitoring a common H-RNTI in the target cell or only monitor the source cell. The WTRU may optionally monitor the HS-SCCH in the target cell for both common H-RNTI and the dedicated H-RNTI used in the source cell simultaneously.

In accordance with another embodiment, a serving cell change channel (SCCCH) is used over the target cell and/or the source cell, which may be masked with a UTRAN radio network temporary identity (U-RNTI), a cell radio network temporary identity (C-RNTI), an H-RNTI, or an E-DCH radio network temporary identity (E-RNTI) of the source cell to indicate to the WTRU to either listen to the common H-RNTI or to confirm that the previous source H-RNTI has also been allocated in the target cell.

In accordance with another embodiment, an HS-SCCH order or an HS-SCCH may be sent over the source cell using the source cell dedicated H-RNTI to indicate to the WTRU that the same H-RNTI has been confirmed in the target cell. The WTRU may then move to the target cell and monitor the HS-SCCH with the H-RNTI used in the source cell. Alternatively, a special reserved value in the E-AGCH in the source cell may be used to indicate the same.

In accordance with another embodiment, the handover command may be sent over the target cell using a special format of the HS-SCCH, wherein a U-RNTI of the WTRU is used instead of an H-RNTI to address the WTRU in the HS-SCCH, (i.e., masking with the U-RNTI instead of H-RNTI). This embodiment may also be used for change of best cell within the active set.

In accordance with another embodiment, a default configuration may be given to the WTRU to use in case a change of best cell occurs outside the active set. The default configuration is only used by a WTRU to receive the handover command over the target cell. If a group of WTRUs have the same default configuration the network may allow only one WTRU to use it at a time.

The embodiments described above may also be used to confirm that the same E-DCH resources, (such as E-RNTI, E-AGCH codes, etc.), are also allocated in the target cell in case of E-DCH serving cell change. The confirmation may also be sent in the target cell using a special reserved value of the E-AGCH masked with the previous source cell E-RNTI.

For the embodiments described above, in case that the WTRU decodes the previous source H-RNTI in the HS-SCCH of the target cell and it does not correspond to the configured HS-SCCH order, the WTRU may not attempt to receive the message. The same may be applied to the E-AGCH masked with the previous source E-RNTI. If the special reserved value is not decoded the WTRU may not use the absolute grant indicated in the target cell.

Optionally, together with the default configuration or common configuration the WTRU may be provided with at least one of fractional dedicated physical channel (F-DPCH) information, dedicated physical control channel (DPCCH) information, high speed dedicated physical control channel (HS-DPCCH) information, and E-DCH resources of the neighboring cell. If the WTRU is confirmed to use that default configuration or has a sole access to the resource, upon getting a confirmation, the WTRU may be triggered to start the power control loop and try to synchronize to the target Node B.

Embodiments for simultaneous reception from both source and target cells are disclosed hereafter. A WTRU receives the handover command from the target cell and the source cell simultaneously. This may be achieved by performing a type of soft handover from the source cell and the target cell. This may be applied to intra-Node B handovers or inter-Node B handovers.

In order to allow soft handover, both source and target cells need to be synchronized such that all MAC-ehs PDUs are of the same size and same transmission sequence number (TSN) numbering is provided from both queues in different cells. Alternatively, the MAC-ehs PDU size may not be the same, but the size of the reordering PDUs (for the priority queue containing the corresponding SRB) and TSN number of the reordering PDUs may be the same.

The soft combining of PDUs may be performed in the reordering queue of the WTRU. The reordering queue may be reserved for the SRB used to send the handover message. The TSN numbers have to be synchronized, (i.e., start at zero), or the source Node B has to explicitly indicate to the target Node B the TSN number to use. This will require the source cell and the WTRU to reset to reordering variables of the reordering queue to which the SRB is mapped to. The scheduling of the MAC-ehs PDUs from both cells have to be such that the maximum delay between the source cell and the target cell does exceed the T1 timer configured for the corresponding reordering queue. This may be achieved by giving priority to this data and/or WTRU over any other data and/or WTRU.

The creation of the same size reordering PDUs may be achieved using one or a combination of the following options. If there is an intra-Node B serving cell change the source cell may indicate to the target cell the size and optionally the CQI it received from the WTRU every transmission time interval (TTI). By guaranteed first priority scheduling the source cell and the target cell may be slightly synchronized. A TSN number may optionally be provided to a target Node B, or the source cell, the target cell, and the WTRU all reset their reordering variables to their initial default values.

Alternatively, the target cell may monitor the HS-DPCCH sent by the WTRU to the source cell and create MAC-ehs PDUs according to the received CQI. Alternatively, the target cell and the source cell may always create reordering PDUs of the same size. A predefined reordering PDU size may always be used for the handover messages. Optionally, the WTRU may be allowed to multiplex more than one reordering PDU from the same reordering queue in one TTI. More specifically, if the reordering PDU size is preconfigured to x bits and the chosen transport block size is y bits, where y>x, then the WTRU may include INT(y/x) reordering PDUs in the given transport block. Each reordering PDU is given a transmission sequence number (TSN), even though they may correspond to the same reordering queue.

Alternatively, the MAC-ehs PDUs may be created independently on both the source Node B and the target Node B, (i.e., different sizes, different TSNs, and different reordering queues). The soft combining of the messages may be performed in the RLC level. Alternatively, the source cell and the target cell may transmit in alternate TTIs.

For simultaneous transmission in both the source cell and the target cell, an HS-SCCH may be sent in a single cell, (either over the source cell or the target cell), whereas an HS-PDSCH (containing RRC handover command) may be sent over both cells. In this case, a new HS-SCCH format may be defined to indicate the HS-PDSCH information in both cells or the conventional HS-SCCH format may be used and the WTRU implicitly knows that the HS-SCCH format is applicable to both cells. Alternatively, an HS-SCCH may be sent in both cells, whereas the HS-PDSCH may be sent in only one cell, the source cell or the target cell. Alternatively, both HS-SCCH and HS-PDSCH may be sent in both cells.

Embodiments for HS-SCCH-less operation for reception in the target cell are disclosed hereafter.

Reception of the handover command in the target cell may be achieved without HS-SCCH. This may be achieved by masking a dedicated or common H-RNTI with the cyclic redundancy check (CRC) that is used in the transmission over HS-DSCH. The message may be sent using a restricted HS-DSCH configuration, (e.g., one or two HS-PDSCH codes), using a restricted set of transport block sizes and restricted modulation and coding schemes to simplify blind detection of the transport block by the WTRU. The "HS-DSCH information" including HS-PDSCH configuration and H-RNTI may be determined as described in the earlier embodiments.

Alternatively, HS-SCCH-less operation for reception of the handover command may be applied in the source cell in addition to, or instead of, the target cell. The embodiments described above are also applicable to the HS-SCCH less operation. The decoding of the H-RNTI in the HS-SCCH would be equivalent to the decoding of the H-RNTI in the CRC.

Figure 3:
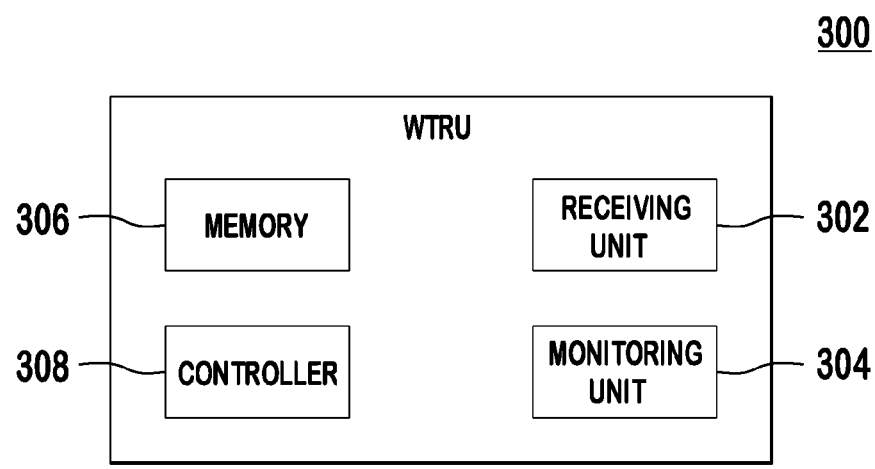
FIG. 3 is a block diagram of an example WTRU.

FIG. 3 is a block diagram of an example WTRU 300. The WTRU 300 includes a receiving unit 302, a monitoring unit 304, a memory 306, and a controller 308. The receiving unit 302 is configured to receive a channel including an HS-SCCH. The monitoring unit 304 is configured to monitor signals on the source cell and at least one neighboring cell. The memory 306 is configured to store pre-loaded HS-DSCH resource information for the target cell. The controller 308 is configured to perform control functions with respect to a serving HS-DSCH cell change from a source cell to a target cell in accordance with the embodiments disclosed above. For example, the controller 308 is configured to detect event 1D with respect to the target cell, start a timer, and control the receiving unit to start monitoring an HS-SCCH on the target cell using a pre-loaded HS-DSCH resource for the target cell on a condition that a measurement report is triggered by the event 1D.

The controller 308 may be configured to perform a handover to the target cell on a condition that a handover message is received before expiry of the timer. The controller 308 may be configured to stop monitoring the HS-SCCH on the target cell on a condition that the timer expires before receiving a handover message for the target cell. The receiving unit 302 may be configured to receive a message from the source cell and the target cell simultaneously, at least one HARQ process being reserved for receiving the message from the target cell. The receiving unit 302 may be configured to receive a message from the source cell and the target cell simultaneously, a same HARQ process used in the source cell being used for receiving the message from the target cell. The controller 308 may be configured to release an HS-DSCH resource in the source cell on a condition that a handover message is received from the target cell before expiry of the timer. The controller 308 may be configured to release an HS-DSCH resource in the source cell on upon decoding an HS-SCCH on the target cell with an expected H-RNTI. The receiving unit 302 may be configured to receive an HS-SCCH only in the target cell and receives an HS-PDSCH both on the source cell and the target cell based on the received HS-SCCH.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A user equipment (UE), the UE comprising:
   a memory; and
   a controller, wherein the controller is configured to:
   send a measurement report related to an event 1A;
   receive target cell pre-configuration information;
   send another measurement report related to an event 1D;
   start a timer;
   monitor a high speed shared control channel (HS-SCCH) of a target cell until expiry of the timer; and
   when a condition has been met, use the target cell pre-configuration information on the target cell.

2. The UE of claim 1 wherein the controller is further configured to report measurements related to neighboring cells prior to the occurrence of a radio link failure.

3. The UE of claim 1 wherein the target cell pre-configuration information is received from a radio network controller (RNC).

4. The UE of claim 1 wherein the controller is further configured to receive a message that indicates a serving cell change; and
   stop monitoring the HS-SCCH of the target cell subsequent to receipt of the message.

5. The UE of claim 4 wherein the message is one of a handover message, a target cell HS-SCCH order, a HS-SCCH order from the target cell, or a radio resource control (RRC) message.

6. The UE of claim 4 wherein the message indicates a serving cell change to the target cell.

7. The UE of claim 1 wherein the target cell pre-configuration information is received, from a network component, in an active set update message.

8. The UE of claim 1 wherein a message that indicates a serving cell change is received, by the UE, from one of a source cell or the target cell.

9. The UE of claim 1 wherein the controller is further configured to release a high speed downlink shared channel (HS-DSCH) resource in a source cell on a condition that a handover message that indicates a serving cell change is received before expiry of the timer.

10. The UE of claim 1 wherein the controller is further configured to release a high speed downlink shared channel (HS-DSCH) resource, in a source cell, upon decoding the HS-SCCH of the target cell with a HS-DSCH radio network temporary identity (H-RNTI).

11. The UE of claim 1 wherein the target cell pre-configuration information is one of a high speed downlink shared channel (HS-DSCH) target cell pre-configuration information, a common resource information, a HS-SCCH code, or a HS-DSCH radio network temporary identity (H-RNTI).

12. The UE of claim 1 wherein the target cell initiates the sending of the measurement report related to the event 1D.

13. A method performed by a user equipment (UE), the method comprising:
    sending, by the UE, a measurement report related to an event 1A;
    receiving, by the UE, target cell pre-configuration information;
    sending, by the UE, another measurement report related to an event 1D;
    starting, by the UE, a timer;
    monitoring, by the UE, a high speed shared control channel (HS-SCCH) of a target cell until expiry of the timer; and
    using, when a condition has been met, the target cell pre-configuration information on the target cell.

14. The method of claim 13 further comprising:
    reporting, by the UE, measurements related to neighboring cells prior to the occurrence of a radio link failure.

15. The method of claim 13 wherein the target cell pre-configuration information is received from a radio network controller (RNC).

16. The method of claim 13 further comprising:
    receiving, by the UE, a message that indicates a serving cell change; and
    stopping, by the UE, monitoring the HS-SCCH of the target cell subsequent to receipt of the message.

17. The method of claim 16 wherein the message is one of a handover message, a target cell HS-SCCH order, a HS-SCCH order from the target cell, or a radio resource control (RRC) message.

18. The method of claim 16 wherein the message indicates a serving cell change to the target cell.

19. The method of claim 13 wherein the target cell pre-configuration information is received, from a network component, in an active set update message.

20. The method of claim 13 wherein a message that indicates a serving cell change is received, by the UE, from one of a source cell or the target cell.

21. The method of claim 13 further comprising:
    releasing, by the UE, a high speed downlink shared channel (HS-DSCH) resource in a source cell on a condition that a handover message that indicates a serving cell change is received before expiry of the timer.

22. The method of claim 13 further comprising:
    releasing, by the UE, a high speed downlink shared channel (HS-DSCH) resource, in a source cell, upon decoding the HS-SCCH of the target cell with a HS-DSCH radio network temporary identity (H-RNTI).

23. The method of claim 13 wherein the target cell pre-configuration information is one of a high speed downlink shared channel (HS-DSCH) target cell pre-configuration information, a common resource information, a HS-SCCH code, or a HS-DSCH radio network temporary identity (H-RNTI).

24. The method of claim 13 wherein the target cell initiates the sending of the measurement report related to the event 1D.

* * * * *